(12) United States Patent
Robbins (10) Patent No.: US 8,320,532 B1
(45) Date of Patent: Nov. 27, 2012

(54) METHOD AND SYSTEM FOR PROVIDING VOICE DIALING SERVICE IN A SIP-BASED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 19 days.

(21) Appl. No.: 11/534,227

(22) Filed: Sep. 22, 2006

Related U.S. Application Data (60) Provisional application No. 60/719,465, filed on Sep. 22, 2005.

(51) Int. Cl.
*H04M 1/64* (2006.01)

(52) U.S. Cl. ............. 379/88.03; 379/216.01; 379/88.01; 379/88.17

(58) Field of Classification Search ............... 348/14.01; 370/328, 465, 352, 353; 379/88.04, 88.17, 379/355.04, 216.01, 355.01, 88.01, 88.03
See application file for complete search history.

(56) References Cited

U.S. PATENT DOCUMENTS

| | | | |
|---|---|---|---|
| 3,737,587 A | 6/1973 | Romero | |
| 4,154,987 A | 5/1979 | Rosenberg et al. | |
| 4,528,424 A | 7/1985 | Middleton et al. | |
| 4,723,271 A | 2/1988 | Grundtisch | |
| 4,741,024 A | 4/1988 | Del Monte et al. | |
| 4,950,011 A | 8/1990 | Borcea et al. | |
| 5,165,095 A * | 11/1992 | Borcherding | 379/88.03 |
| 5,323,444 A | 6/1994 | Ertz et al. | |
| 5,471,519 A | 11/1995 | Howe et al. | |
| 5,619,561 A | 4/1997 | Reese | |
| 5,815,550 A | 9/1998 | Miller | |
| 5,835,570 A * | 11/1998 | Wattenbarger | 379/88.03 |
| 5,913,166 A | 6/1999 | Buttitta et al. | |
| 5,970,134 A | 10/1999 | Highland et al. | |
| 5,999,610 A | 12/1999 | Lin et al. | |
| 6,021,176 A | 2/2000 | McKendry et al. | |
| 6,026,156 A | 2/2000 | Epler et al. | |
| 6,031,896 A | 2/2000 | Gardell et al. | |
| 6,072,865 A | 6/2000 | Haber et al. | |
| 6,208,726 B1 | 3/2001 | Bansal et al. | |
| 6,219,414 B1 | 4/2001 | Maciejewski et al. | |
| 6,308,726 B2 | 10/2001 | Sato et al. | |
| 6,337,898 B1 | 1/2002 | Gordon | |
| 6,339,639 B1 | 1/2002 | Henderson | |
| 6,404,876 B1 * | 6/2002 | Smith et al. | 379/218.01 |
| 6,484,196 B1 | 11/2002 | Maruille | |
| 6,510,315 B1 | 1/2003 | Arnson | |
| 6,636,594 B1 | 10/2003 | Oran | |
| 6,735,295 B1 | 5/2004 | Brennan et al. | |
| 6,741,695 B1 | 5/2004 | McConnell et al. | |

(Continued)

OTHER PUBLICATIONS

Newton's Telecom Dictionary 22nd Edition, Pae 829, Feb. 2006.*

(Continued)

*Primary Examiner* — Antim Shah (57) ABSTRACT

A system and method may include establishing a processing data session over a data network based on a processing data session request from a remote communication device, identifying a dialing directory based on the processing data session request, the dialing directory including multiple complete addresses, and receiving address information over the data network via the processing data session. The system and method may further include processing the address information to determine whether the address information corresponds to one of the plurality of complete addresses, and providing the corresponding one of the plurality of complete addresses over the data network to the remote communication device.

23 Claims, 7 Drawing Sheets

U.S. PATENT DOCUMENTS

| | | | |
|---|---|---|---|
| 6,744,877 B1 | 6/2004 | Edwards | |
| 6,754,325 B1 | 6/2004 | Silver et al. | |
| 6,801,604 B2* | 10/2004 | Maes et al. | 379/88.17 |
| 6,807,259 B1 | 10/2004 | Patel et al. | |
| 6,834,048 B1 | 12/2004 | Cho et al. | |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1 | 4/2005 | Takeda | |
| 6,879,673 B2 | 4/2005 | Creamer et al. | |
| 6,954,521 B2 | 10/2005 | Bull et al. | |
| 6,954,524 B2 | 10/2005 | Gibson | |
| 6,961,332 B1 | 11/2005 | Li et al. | |
| 6,963,633 B1* | 11/2005 | Diede et al. | 379/88.03 |
| 6,965,614 B1 | 11/2005 | Osterhout et al. | |
| 6,985,961 B1 | 1/2006 | Ramsayer et al. | |
| 6,996,605 B2 | 2/2006 | Low et al. | |
| 7,020,130 B2 | 3/2006 | Krause et al. | |
| 7,031,700 B1 | 4/2006 | Weaver et al. | |
| 7,039,710 B2 | 5/2006 | Khartabil | |
| 7,050,559 B2 | 5/2006 | Silver et al. | |
| 7,082,193 B2 | 7/2006 | Barclay et al. | |
| 7,085,253 B2 | 8/2006 | Yang | |
| 7,130,282 B2 | 10/2006 | Black | |
| 7,145,997 B2 | 12/2006 | Poikselka et al. | |
| 7,203,293 B1 | 4/2007 | Bedingfield | |
| 7,224,792 B2 | 5/2007 | Fusco | |
| 7,257,837 B2 | 8/2007 | Xu et al. | |
| 7,260,201 B2 | 8/2007 | Jorasch et al. | |
| 7,274,662 B1 | 9/2007 | Kalmanek et al. | |
| 7,283,517 B2 | 10/2007 | Yan et al. | |
| 7,290,288 B2* | 10/2007 | Gregg et al. | 726/28 |
| 7,295,577 B2 | 11/2007 | Moody et al. | |
| 7,301,913 B2 | 11/2007 | Corrao et al. | |
| 7,406,696 B2 | 7/2008 | Burger et al. | |
| 7,426,265 B2 | 9/2008 | Chen et al. | |
| 7,440,440 B1 | 10/2008 | Abichandani et al. | |
| 7,460,657 B1 | 12/2008 | Baeza | |
| 7,489,771 B2 | 2/2009 | McMurry et al. | |
| 7,580,497 B2 | 8/2009 | Wang et al. | |
| 7,593,389 B2 | 9/2009 | Vance | |
| 7,599,355 B2 | 10/2009 | Sunstrum | |
| 7,609,700 B1 | 10/2009 | Ying et al. | |
| 7,609,706 B2 | 10/2009 | Scott et al. | |
| 7,630,481 B2 | 12/2009 | Kafka | |
| 7,715,413 B2 | 5/2010 | Vaziri et al. | |
| 7,743,141 B2 | 6/2010 | Wang et al. | |
| 7,773,581 B2 | 8/2010 | Punj et al. | |
| 7,860,089 B2 | 12/2010 | Tripathi et al. | |
| 8,059,805 B2 | 11/2011 | Claudatos et al. | |
| 8,116,302 B1 | 2/2012 | Robbins | |
| 2002/0038388 A1 | 3/2002 | Netter | |
| 2002/0114318 A1* | 8/2002 | Rines | 370/352 |
| 2002/0131447 A1* | 9/2002 | Krishnamurthy et al. | 370/465 |
| 2002/0136359 A1 | 9/2002 | Stumer et al. | |
| 2002/0136363 A1 | 9/2002 | Stumer et al. | |
| 2002/0137495 A1 | 9/2002 | Gabrysch | |
| 2002/0141548 A1* | 10/2002 | Boda | 379/88.01 |
| 2002/0156900 A1 | 10/2002 | Marquette et al. | |
| 2003/0028806 A1* | 2/2003 | Govindarajan et al. | 713/201 |
| 2003/0043992 A1 | 3/2003 | Wengrovitz | |
| 2003/0088421 A1* | 5/2003 | Maes et al. | 704/270.1 |
| 2003/0231759 A1* | 12/2003 | Bedingfield et al. | 379/355.01 |
| 2004/0030750 A1* | 2/2004 | Moore et al. | 709/204 |
| 2004/0037403 A1 | 2/2004 | Koch | |
| 2004/0051900 A1 | 3/2004 | Sagiya et al. | |
| 2004/0082324 A1 | 4/2004 | Ayoub | |
| 2004/0090954 A1 | 5/2004 | Zhang et al. | |
| 2004/0148395 A1 | 7/2004 | Schulzrinne | |
| 2004/0207724 A1 | 10/2004 | Crouch et al. | |
| 2004/0240656 A1 | 12/2004 | Poustchi | |
| 2004/0243680 A1 | 12/2004 | Mayer | |
| 2004/0249951 A1* | 12/2004 | Grabelsky et al. | 709/227 |
| 2004/0264406 A1* | 12/2004 | Pattenden et al. | 370/328 |
| 2005/0013421 A1 | 1/2005 | Chavez et al. | |
| 2005/0043014 A1 | 2/2005 | Hodge | |
| 2005/0069104 A1 | 3/2005 | Hanson et al. | |
| 2005/0078642 A1 | 4/2005 | Mayer et al. | |
| 2005/0123104 A1* | 6/2005 | Bishop et al. | 379/88.04 |
| 2005/0129219 A1* | 6/2005 | Williamson | 379/355.04 |
| 2005/0147227 A1 | 7/2005 | Chervirala et al. | |
| 2005/0190721 A1 | 9/2005 | Pershan | |
| 2005/0193338 A1* | 9/2005 | Hawkins et al. | 715/700 |
| 2005/0195802 A1 | 9/2005 | Klein et al. | |
| 2005/0201530 A1* | 9/2005 | Koch et al. | 379/88.04 |
| 2005/0213716 A1 | 9/2005 | Zhu et al. | |
| 2005/0215243 A1 | 9/2005 | Black et al. | |
| 2005/0226217 A1 | 10/2005 | Logemann et al. | |
| 2005/0237978 A1 | 10/2005 | Segal | |
| 2005/0249196 A1 | 11/2005 | Ansari et al. | |
| 2005/0286466 A1 | 12/2005 | Tagg et al. | |
| 2006/0033809 A1* | 2/2006 | Farley | 348/14.01 |
| 2006/0039389 A1 | 2/2006 | Burger et al. | |
| 2006/0062210 A1 | 3/2006 | Dharanikota | |
| 2006/0062251 A1 | 3/2006 | Lim et al. | |
| 2006/0067300 A1 | 3/2006 | Poustchi et al. | |
| 2006/0067504 A1 | 3/2006 | Goldman et al. | |
| 2006/0140379 A1 | 6/2006 | Yamamoto et al. | |
| 2006/0140380 A1 | 6/2006 | Croak et al. | |
| 2006/0146737 A1 | 7/2006 | Ohrstrom Sandgren et al. | |
| 2006/0165060 A1 | 7/2006 | Dua | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1 | 9/2006 | Gibson | |
| 2006/0218283 A1 | 9/2006 | Jones | |
| 2006/0221176 A1 | 10/2006 | Di Pietro et al. | |
| 2006/0251229 A1 | 11/2006 | Gorti et al. | |
| 2006/0285533 A1 | 12/2006 | Divine et al. | |
| 2006/0286984 A1 | 12/2006 | Bonner | |
| 2007/0025270 A1* | 2/2007 | Sylvain | 370/254 |
| 2007/0058613 A1 | 3/2007 | Beckemeyer | |
| 2007/0083658 A1 | 4/2007 | Hanna et al. | |
| 2007/0092073 A1 | 4/2007 | Olshansky et al. | |
| 2007/0111723 A1 | 5/2007 | Ahmed et al. | |
| 2007/0143858 A1 | 6/2007 | Hearty | |
| 2007/0280469 A1 | 12/2007 | Baker et al. | |
| 2008/0049724 A1 | 2/2008 | Tsujino et al. | |
| 2008/0126549 A1 | 5/2008 | Khanchandani et al. | |

OTHER PUBLICATIONS

Request for Comments (RFC) 2833, H. Schulzrinne, May 2000, pp. 1-29.*
Request for Comments (RFC) 3515, R. Sparks, Apr. 2003, pp. 1-23.*
www.carrollcommunication.com Nov. 6, 2007.
Cisco Callmanager Features and Services Guide, Release 4.1(3) Oct. 27, 2007.
Rosenberg et al, Network Working Group, RFC 3261 Jun. 2002.
Newton's Telecom Dictionary 22nd Edition, p. 829, 2006.
Sparks, Network Working Group RFC 3515 Apr. 2002.
Mahy et al, network Working Group RFC 3891, Sep. 2004.
Mahy et al, Network Working Group RFC 3911 Oct. 2004.
Handley et al, Network Working Group RFC 2327, Apr. 1998.
Schulzrinne et al, Network working Group RFC 1889 Jan. 1996.
Schulzrinne et al, Network Working Group RFC 2833, May 2000.
Mahy, SIP "Join" Header Internet Draft, Feb. 2004.
Mahy, A Call Control and Multi-party usage framework for the Session Initiation Protocol—Internet Draft, Oct. 27, 2003.
Rosenberg et al, Network Working Group RFC 3311, Sep. 2002.
Rosenberg et al, Network Working Group RFC 3262 Jun. 2002.
Jennings et al, Network Working Group RFC 3325, Nov. 2002.
Harrington et al, Network Working Group RFC 3411, Dec. 2002.
Rosenberg et al, Network Working Group RFC 3840, Aug. 2004.
Mahy et al, Network Working Group RFC 3842, Aug. 2004.
Telcordia Technologies, SPC Capabilities and Features, Telcordia Tech. Special Report SR-504, issue 1, Mar. 1996.
Telcordia Technologies, LSSGR Guide, Telcordia Tech. Special Report SR-3065, Issue 7, Aug. 2003.
Mahy et al, The Session Initiation Protocol "Replaces" Header—Internet Draft Feb. 16, 2004.
Schulzrinne et al, Emergency Services URL for the Session Initiation Protocol—Internet Draft Feb. 8, 2004.

Rosenberg et al, An INVITE Initiated Dialog Even Package for the SIP—Internet Draft Feb. 13, 2004.
Lingle et al, Management Information Base for Seession Initiation Protocol—Internet Draft Jul. 16, 2004.
Johnston et al, Session Initiation Protocol Call Control—Internet Draft Jul. 18, 2004.
Sparks et al, Session initiation Protocol Call Control—Internet Draft Feb. 15, 2004.

Rosenberg et al, Session Initiation Protocol Even Package for Conference STate—Internet Draft May 21, 2004.
Petrie et al, Framework for Session Initiation Protocol User Agent Profile Delivery—Internet Draft Jul. 19, 2004.
Telcordia Technologies, AINGR: Switching Systems, GR-1298-CORE, Issue 6, Nov. 2000.

* cited by examiner

| Entry 602 | Shortened Address Information 604 | Complete Address Information 606 |
|---|---|---|
| 1 | Name Information N1 | C1 |
| 2 | Name Information N2 | C2 |
| 3 | Name Information N3 | C3 |
| 4 | Number Sequence S1 | C4 |
| 5 | Number Sequence S2 | C5 |
| 6 | Number Sequence S3 | C6 |

METHOD AND SYSTEM FOR PROVIDING VOICE DIALING SERVICE IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a packet-switched and/or packet-based network such as a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides establishing a processing data session over a data network based on a processing data session request from a remote communication device, identifying a dialing directory based on the processing data session request, the dialing directory including multiple complete addresses, and receiving address information over the data network via the processing data session. The system and process of an exemplary embodiment may further include processing the address information to determine whether the address information corresponds to one of the plurality of complete addresses, and providing the corresponding one of the plurality of complete addresses over the data network to the remote communication device.

The term module, as used herein, may refer to hardware, software, firmware, and/or combinations thereof.

Figure 1:
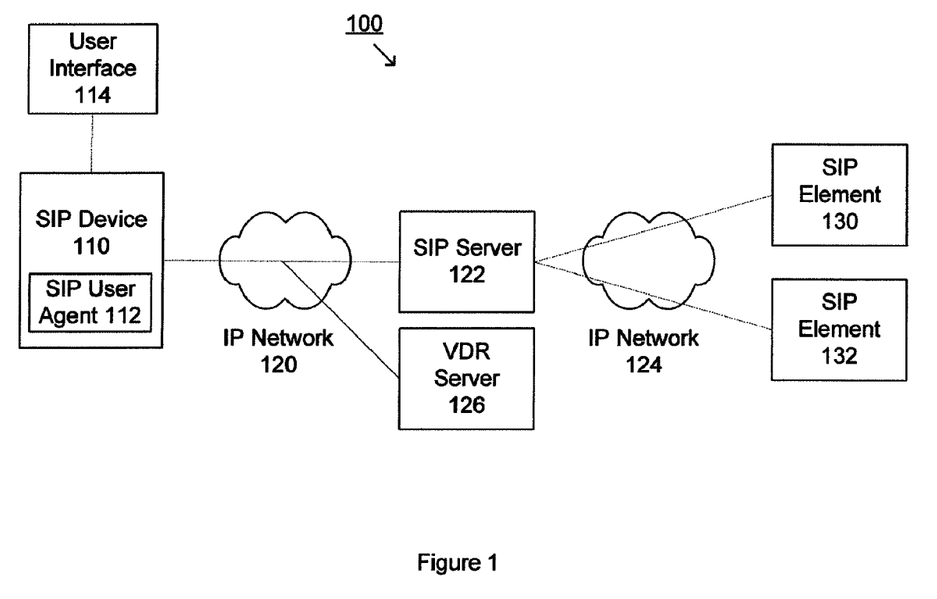
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular, for providing voice dialing service in a data network. As illustrated, SIP Device 110 may be coupled to User Interface 114. SIP Device 110 may include a SIP User Agent 112 for communicating across IP Network 120 to a SIP Server 122 and to a Voice Dialing Recognition (VDR) Server 126. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voice-band or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

Figure 2:
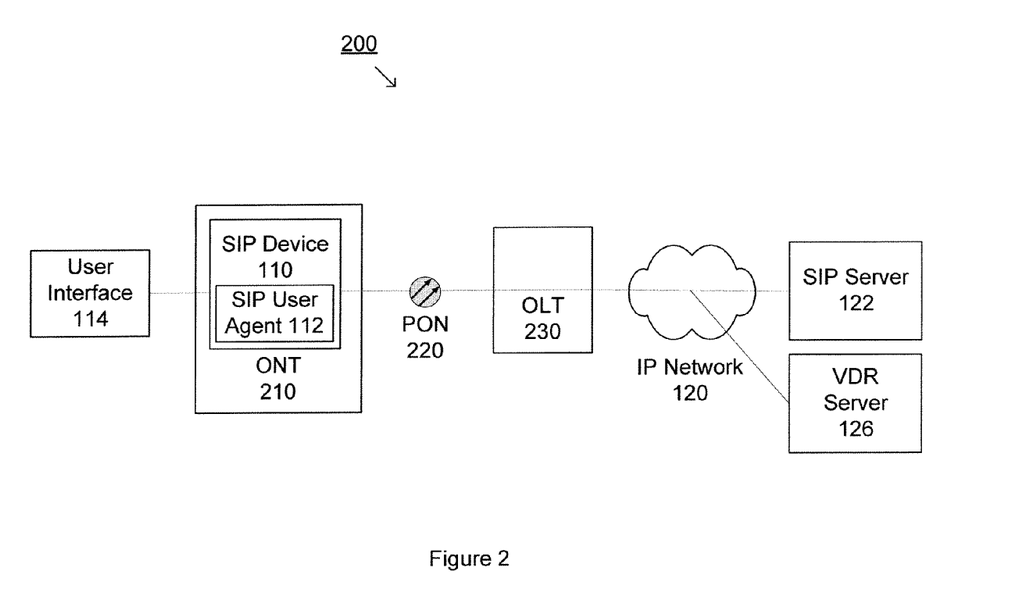
FIG. 2 illustrates an exemplary implementation where a SIP Device is used in connection with a FTTP network, according to an embodiment of the present invention.
Figure 3:
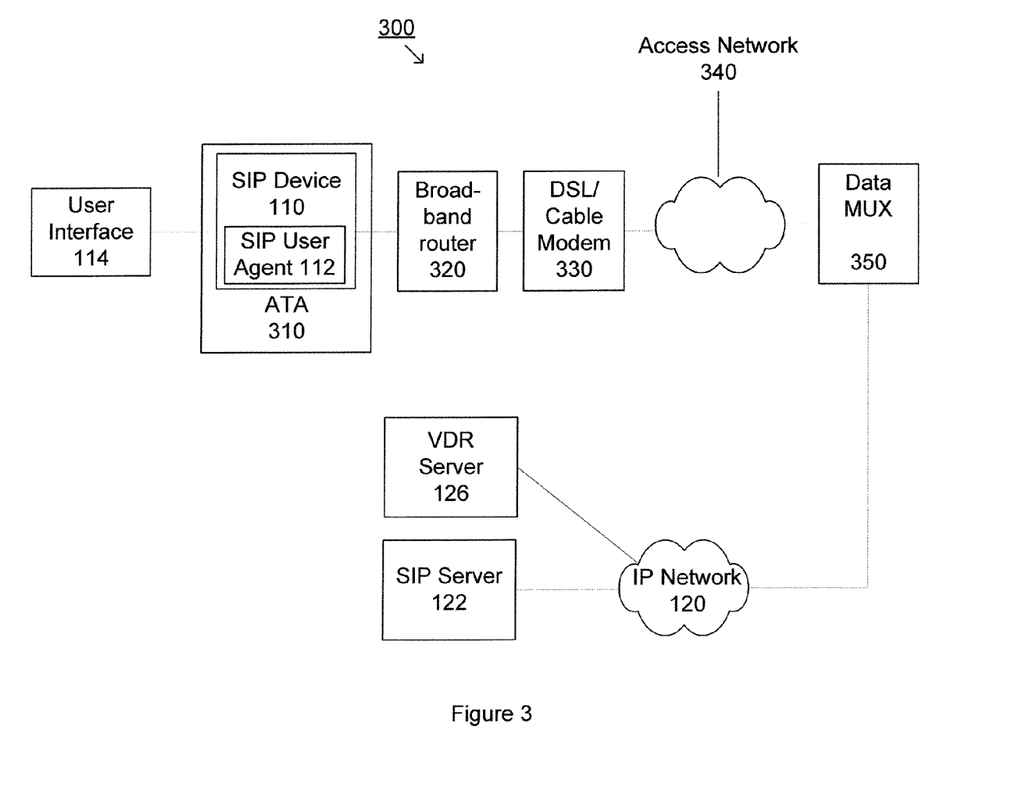
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

Voice dialing allows a caller to speak a calling party name (or other identifier), which may then used to select an associated phone number and to connect a call. Conventional SIP does not provide for voice dialing. Exemplary embodiments of the present inventions solve these and other problems by providing support for both standard digit dialing and voice dialing.

Figure 4:
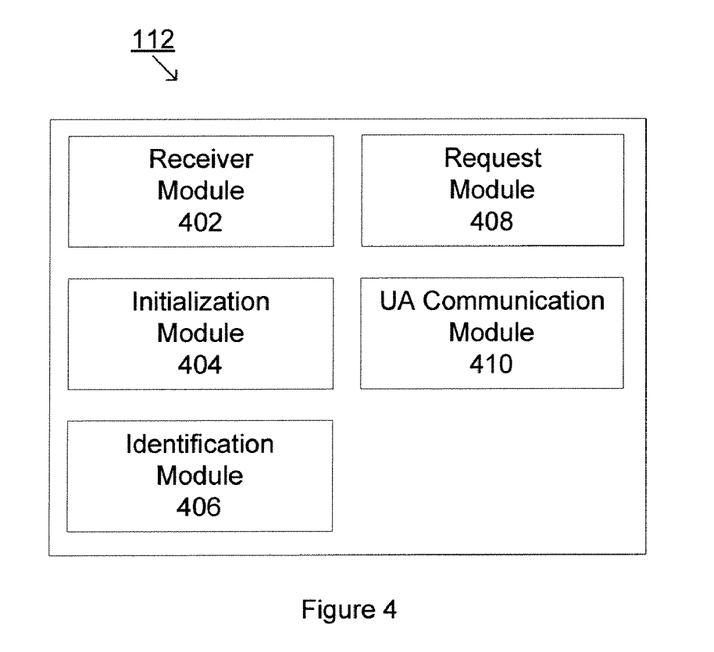
FIG. 4 illustrates an exemplary embodiment of various modules of a SIP User Agent, according to an embodiment of the present invention.

FIG. 4 illustrates various modules included in the SIP User Agent 112 of the SIP Device 110 for processing and establishing data sessions based on information communicated from the User Interface 114. Data sessions may be SIP dialogs, for example. The SIP Device 110 may function as a gateway device for communicating across the IP Network 120 and with the User Interface 114. In an exemplary embodiment, the SIP User Agent 112 may include a receiver module 402, an initialization module 404, an identification module 406, a request module 408, and a User Agent (UA) communication module 410. It is noted that the modules 402-410 are exemplary. Other modules may be included in the SIP User Agent 112. In addition, the modules 402-410 may be combined, integrated, and/or duplicated to support various applications. Further, the modules 402-410 may be implemented across multiple User Agents and/or other components.

The receiver module 402 may receive analog signals from the User Interface 114 and may convert the signals to a form suitable for transport over the IP networks 120 and 124. The analog signals may include an initialization signal, coded signals, and telephony signals. In an exemplary embodiment, the initialization signal may represent the User Interface 114 signaling the SIP Device 110 to initiate establishing a data session. For example, the initialization signal may be an "off-hook" signal (e.g., off hook event) generated by the User Interface 114 when a user lifts a telephone receiver. The initialization signal also may be a signal indicating that the user has pressed a button labeled "Talk" or "On," or may be other known signals to initiate establishing a data session. The coded signals may be Dual-Tone Multi-Frequency (DTMF) signals or may be pulse dialing signals. The DTMF signals may correspond to the DTMF signals 1-9, A-D, '*', or '#,' for example. Coded signals corresponding to analog signaling schemes other than DTMF also may be used. The telephony signals may be signals representing a voice of the user of the User Interface 114 captured at a microphone in a telephone receiver, for example. The receiver module 402 may receive the analog signals, digitize the analog signals, and place the digitized analog signals in a data type suitable for transport over the IP Networks 120 and 124. For example, the digitized analog signals may be packaged in IP packets. The digitized analog signals also may be packaged as other data types, such as Asynchronous Transfer Mode (ATM) cells, frames, etc., or other digital representations of analog signals for transport across other networks, as are well known.

The initialization module 404 may monitor analog signals received at the receiver module 402 for the initialization signal. Once the initialization signal is received, the initialization module 404 may instruct the identification module 406 to obtain identification information on the User Interface 114 and/or the user, and to forward the identification information to the request module 410. The identification information may uniquely identify the User Interface 114 and/or a user of the User Interface 114. For example, the identification information may include a name of the user, a password of the user, a home address, a phone number, an IP address, a serial number of the User Interface 114, other information to uniquely identify the user and the User Interface 114, and/or combinations thereof. The identification information may be locally stored at the SIP Device 110, or may be stored remote to the SIP Device 110. The identification module 406 also may prompt the user and/or query the User Interface 114 for the identification information. Once obtained, the identification module 406 may forward the identification information to the request module 408.

The request module 408 may generate a processing data session request for requesting establishment of a processing data session between the SIP Device 110 and the VDR Server 126. The processing data session request may include the identification information for identifying the User Interface 114 and/or the user. The request module 408 also may generate a data session request for establishing a data session between the SIP Device 110 and another device, such as the SIP Element 130 or 132, for example. Once generated, the request module 408 may forward the processing data session request or the data session request to the UA communication module 410.

The UA communication module 410 may communicate the processing data session request to the VDR Server 126 over the IP Network 120, and may communicate the data session request to the SIP Server 122. After the processing data session is established, the UA communication module 410 may transmit data to and receive data from the VDR Server 126. After the data session is established, the UA communication module 410 may transmit data to and receive data from with the SIP Element 130 over the IP Networks 120 and 124, for example.

Figure 5:
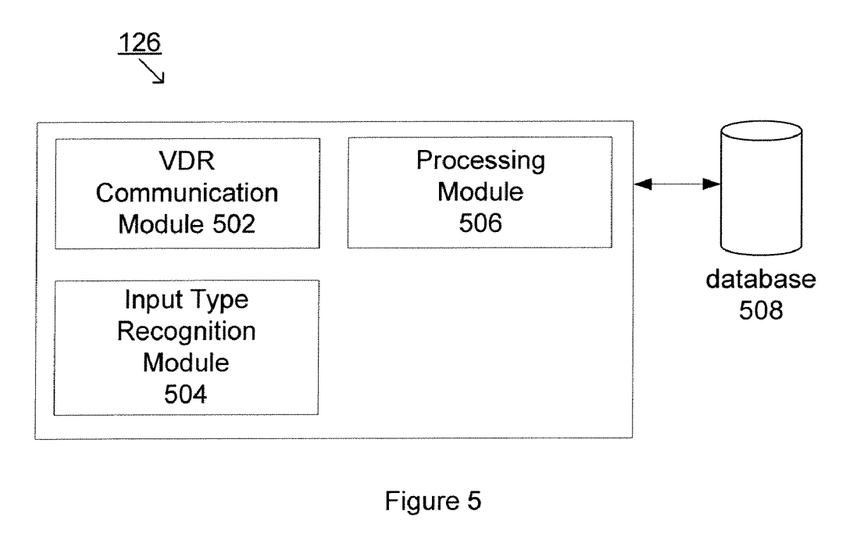
FIG. 5 illustrates an exemplary embodiment of various modules of a Voice Dialing Recognition Server, according to an embodiment of the present invention.

FIG. 5 illustrates an exemplary embodiment of various modules included in the VDR Server 126. The VDR Server 126 may receive data from the SIP Device 110 over the IP Network 120 via the processing data session based on information transmitted by the User Interface 114. In an exemplary embodiment, the VDR Server 126 may include a VDR communication module 502, an input type recognition module 504, and a processing module 506. It is noted that the modules 502-506 are exemplary. Other modules may be included in the VDR Server 126. In addition, the modules 502-506 may be combined, integrated, and/or duplicated to support various applications. Further, the modules 502-506 may be implemented across multiple servers and/or other components, and some or all of the modules 502-506 may be implemented at the SIP User Agent 112.

The VDR communication module 502 may receive the processing data session request from the SIP Device 110 and may establish a processing data session between the VDR Server 126 and the SIP Device 110. After the processing data session is established, the VDR communication module 502 may forward action prompt information instructing the SIP Device 110 to generate an analog signal useable to produce a message at the User Interface 114 requesting the user select an action. For example, the action may be to add, delete, or modify an address stored at a voice dialing recognition (VDR) directory, or to generate a connection request for establishing a data session. The action prompt information may include instructions for optionally generating a dial tone or a short or long burst of dial tone, followed by a message requesting the user to dial or speak a name, for example.

The VDR communication module 502 may then start a timer to wait for a response from the user. If no response is received at the expiration of the time interval, the VDR communication module 502 may generate error information for generating an error message. If a response is received in the time interval, then the SIP Device 110 may create action response information (e.g., packets containing digitized analog signals received from user) based on the analog signals produced by the User Interface 114 in response to voice signals or coded signals entered by the user. For example, the action response information may be one or more packets containing digitized voice of a user selecting to add an address to the VDR directory. The SIP Device 110 may then transmit the action response information to the VDR Server 126. The VDR communication module 502 of the VDR server 126 may receive and forward the action response information to the input type recognition module 504.

The input type recognition module 504 may determine an input type of the action response information. For example, the input type recognition module 504 may determine whether the action response information contains one or more packets of digitized voice signals or coded signals (e.g., digitized DTMF signals). Once determined, the input type recognition module 504 may forward the action response information along with the input type to the processing module 506.

The processing module 506 may determine whether the action response information corresponds to creating and/or updating a VDR directory or to generating a connection request for establishing a data session. The VDR directory may permit voice dialing or shortened digit dialing based on a shortened address received from the user of the User Interface 114. The VDR directory may be a set of mappings from the shortened address to a complete address. For example, the VDR directory may map the user's spoken voice to a string of digits. Initially, the VDR directory may be empty. The VDR directory may be stored in a database 508 communicatively coupled to the VDR server 126. The database 508 may store multiple VDR directories each being associated with the identification information of the user and/or the User Interface 114.

In an exemplary embodiment, the VDR directory may associate a shortened address with a complete address, and when the user speaks or enters the shortened address, the VDR directory may identify the complete address based on the shortened address. The shortened address may correspond to a sequence of numbers or one or more words spoken by the user, and the complete address may correspond to an address of a device on the IP Networks 120 and 124, or on a telephone network. For example, a user may speak a name of a friend into a telephone receiver at the User Interface 114, and the SIP Device 110 may forward a packetized version of the name to the VDR Server 126. The processing module 506 of the VDR Server 126 may process the packetized version of the spoken name and may deteiniine if the name corresponds to an entry of the VDR directory. If an entry exists, the processing module 506 may obtain a complete address, such as a ten digit phone number, from the VDR directory based on the spoken name, for example. Thus, a user may not be required to speak or enter the entire ten digit phone number to obtain a complete address.

To create and/or update the VDR directory, the VDR Server 126 may generate prompt information instructing the SIP Device 110 to generate various messages to interact with a user at the User Interface 114. The prompt information may be one or more packets (or of other data types) associated with a message for prompting the user to speak a name or an abbreviated code (e.g., speed dial number, etc.) that may be used as a shortened address for a complete address. The user may then respond by speaking or entering a coded signal at the User Interface 114, which may then be packetized as shortened address information and communicated by the SIP Device 110 to the VDR Server 126.

The processing module 506 may then generate a second prompt information associated with a message for prompting the user to enter or speak an address. The user may then respond by speaking or entering a coded signal at the User Interface 114, which may then be packetized and communicated by the SIP Device 110 to the VDR Server 126 as address information. The processing module 506 of the VDR Server 126 may then verify that the address information corresponds to a complete address. The address information may correspond to a complete address if the address information is a valid address identifying a device on the IP Network 120 or 124 or a device on a telephony network, if the address information corresponds to a format of known complete addresses, or if the address information includes an express indication of end-of-dialing (e.g., # symbol, "send" key, etc.). The complete address information may be a sequence of letters, digits, other symbols, and/or combinations thereof. The processing module 506 may use matching rules of a dialing plan to determine if the address information matches a format of a known complete address. Dialing plans are further discussed in co-pending U.S. patent application Ser. No. 11/534,281, titled "Method and System for Providing Variable Dial Pattern Provisioning in a SIP-based Network," the contents of which are incorporated herein by reference in its entirety.

If the address information does not correspond to a complete address, then the processing module 506 may generate error information associated with an error message for informing the user that the entered address information does not correspond to a complete address. For example, the error message may be audibly produced at the User Interface 114 to indicate that the dialed digits do not correspond to a known telephone number. The error message also may be a tone, a visual message, an audible message, and/or combinations thereof.

Figure 6:
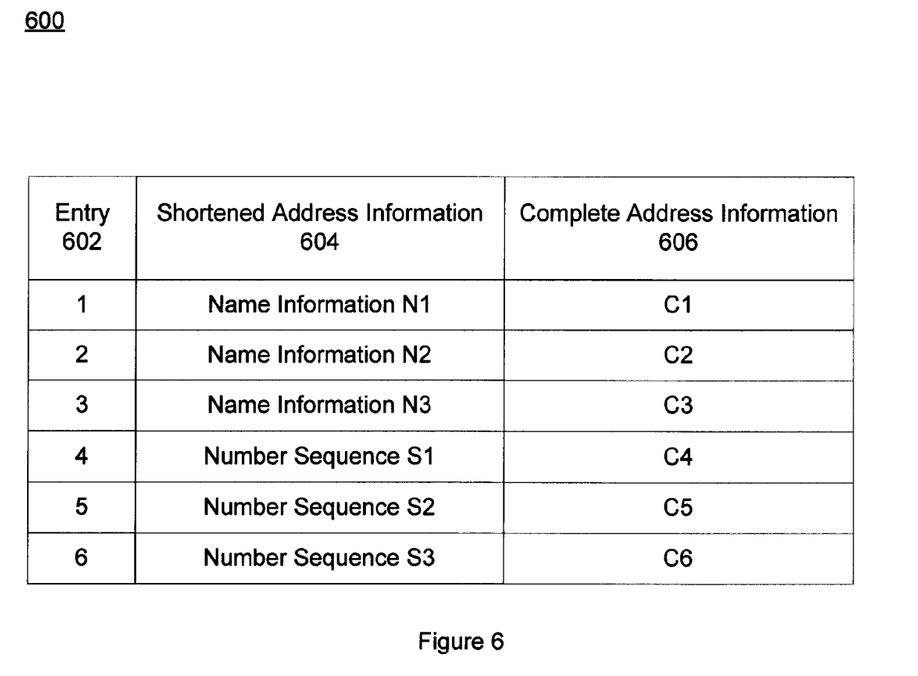
FIG. 6 illustrates an exemplary embodiment of an association table of a voice dialing recognition directory, according to an embodiment of the present invention.

After verification of the address information, the processing module 506 may associate the shortened address information with the complete address information in the VDR directory. For example, the processing module 506 may store in the database 508 the shortened address information and the complete address information in an entry of a VDR directory associated with the identification information of the user and/or the User Interface 114. FIG. 6 illustrates an exemplary association table 600 for a particular identification information illustrating the association between the shortened address information and the complete address information in the VDR directory. The association table 600 includes an entry column 602, a shortened address column 604, and a complete address column 606. The entry column 602 may identify the entry number, the shortened address column 604 may include the shortened address information, and the complete address column 606 may include the complete address information associated with the shortened address information for that entry.

For example, entries 1-3 of the shortened address column 604 respectively include name information N1-3 and entries 1-3 of the complete address column 606 include complete address information C1-3. Name information N1-3 may be one or more packets containing digitized voice signals of a user speaking a name or a word. Entries 4-6 of the shortened address column 604 respectively include number sequence information S1-3 and entries 4-6 of the complete address column 606 include the complete address information C4-6. If a user speaks a name corresponding to any of name information N1-3, the associated complete address information may be C1-3, respectively, for the spoken name. If a user enters a number sequence corresponding to any of number sequence information S1-3, the associated complete address information may be C4-6, respectively, for the entered number sequence.

If the processing module 506 determines that the action response information corresponds to generating a connection request, the processing module 506 may generate prompt information (e.g., packets, etc.) associated with a message for prompting the user to enter a shortened address and/or a complete address. For example, the prompt information may instruct the SIP Device 110 to generate analog signals for audibly producing a message at the User Interface 114. The message may instruct the user to dial or speak a telephone number of one or more digits or to speak one or more words, for example. The processing module 506 also may monitor a time interval and may generate error information if the user does not respond to the message within the time interval. To respond, the user may input either a shortened address or a complete address by speaking one or more numbers or words, or by entering a coded signal (e.g., dialing a digit or a letter) at the User Interface 114, which may produce analog signals based on the user input. The SIP Device 110 may generate address information including one or more packets based on the received analog signals and may forward the address information to the VDR Server 126.

The VDR Server 126 may process the address information to determine whether the user has entered coded signals or voice signals. For example, the coded signals may be transmitted from the SIP Device 110 as inband tones or Request for Comments (RFC) 2833 events, or as packetized voice signals. RFC 2833, titled "RTP Payload for DTMF Digits, Telephony Tones and Telephony Signals," Network Working Group, May 2000, is hereby incorporated by reference in its entirety. For voice signals, the VDR Server 126 may identify packetized voice signals of sufficient energy in the address information, and may stop processing the packetized voice signals after a period of insufficient energy (e.g., corresponding to silence from a user) greater than a threshold time interval (e.g., two seconds) or after determining that the packetized voice signals match a word or name recorded in a single entry in the VDR directory associated with the identification information of the user, as described below in further detail.

The processing module 506 of the VDR Server 126 may determine whether the address information corresponds to a complete address or to a shortened address. The processing module 506 may analyze the address information to determine whether the address information corresponds to any of the shortened addresses within the VDR directory. For example, the processing module 506 may determine whether the packetized voice signals match a shortened address information storing similar packetized voice signals included as an entry in the VDR directory. The received packetized voice signals may be similar to the stored packetized voice signals associated with the VDR directory, but may differ somewhat. The VDR Server 126 may perform signal processing on the received packetized voice signals and the stored packetized voice signals to determine correspondence within a desired confidence level and/or error rate. For coded signals, the processing module 506 may determine whether the packetized coded signals match a shortened address information storing the same packetized coded signals included as an entry in the VDR directory. If the processing module 506 identifies a match, the processing module 506 may retrieve the complete address information from the VDR directory associated with the shortened address information.

If the processing module 506 does not identify a match with an entry in the VDR directory, then the processing module 506 may analyze the address information based on the dialing plan. If the processing module 506 determines that the address information corresponds to a complete address based on the dialing plan, then the processing module 506 may generate complete address information based on the address information. For example, the processing module 506 may include digits, letters, and/or symbols in the complete address information corresponding to the digital representations of spoken digits, letters, and/or symbols included in the address information. For coded signals, the processing module 506 may include digits, letters, and/or symbols in the complete address information corresponding to the packetized coded signals of the address information. If the processing module 506 determines that the address information does not correspond to a complete address, the processing module 506 may generate error infoiination.

If complete address information is identified, the processing module 506 may then instruct the VDR communication module 502 to forward the complete address information to the SIP Device 110. In an exemplary SIP embodiment, the processing module 506 may package the complete address information as a uniform resource identifier (URI) in a "Refer-To" header field of a REFER message. The processing module 506 may then instruct the VDR communication module 502 to send the REFER message to SIP Device 110. After receiving the REFER message, the SIP Device 110 may send a NOTIFY response to the VDR Server 126 indicating that the SIP Device 110 has received the REFER message and may send a final status (e.g., a Hypertext Transfer Protocol (http) 100 response code) after interpreting the URI of the Refer-To field.

The request module 408 of the SIP Device 110 may interpret the URI in the Refer-To header field as complete address information (e.g., dialed digits) as if the SIP Device 110 had collected the complete address information from the user of the User Interface 114 without interacting with the VDR Server 126. The request module 408 may generate a connection request with a destination address based on the complete address information. The destination address may be the address of the SIP Element 130, for example. The request module 408 may then instruct the UA communication module 410 to forward the connection request to the SIP Server 122. The SIP Server 122 may use the connection request to establish a data session between the SIP Device 110 and the device identified by the destination address in the connection request (e.g., SIP Element 130). For example, the connection request may be a SIP INVITE message. Upon sending the connection request (e.g., a SIP INVITE message), the SIP Device 110 may send a success response (e.g., SIP Notify that includes the http 200 response) to the VDR Server 126 indicating that the SIP Device 110 has properly generated the connection request (e.g., SIP INVITE message) based on the complete address information, and the VDR Server 126 may then send a terminate response (e.g., SIP BYE response) to end the processing data session with SIP Device 110.

Thus, the VDR Server 126 may support a VDR directory that may be shared by multiple SIP Devices and SIP Elements and may efficiently use resources of the VDR Server 126. The above systems also support voice dialing of any number sequence that may be dialed at the User Interface using non-voice dialing.

It is noted that the VDR directory also may be local to or integrated into the SIP Device 110, and thus the SIP Device 110 may locally manage voice and digit dialing without the VDR Server 126. This advantageously may not use network resources. In such an embodiment, the SIP Device 110 may be more complex, and the VDR directory may or may not be accessible by other devices on the IP Networks 120 and 124. Also, the SIP Device 110 may locally process address information containing sequences of coded signals (e.g. dialed digits), or subsequences, and may forward address information to the VDR Server 126 containing voice signals. For example, the SIP Device 110 may contain some of the functionality of the processing module 506 for determining whether coded signals correspond to a complete address based on a dialing plan. Additionally, the SIP Server 122 may include the components of the VDR Server 126, and instead of forwarding the complete address information (e.g., in a REFER message) to the SIP Device 110, the SIP Server 122 may use the processing data session as a portion of the data session and may communicate through the SIP Server 122 with the SIP Element 130, for example. This may consume resources of the SIP Server 122 to remain in the call path for the duration of the call.

Figure 7:
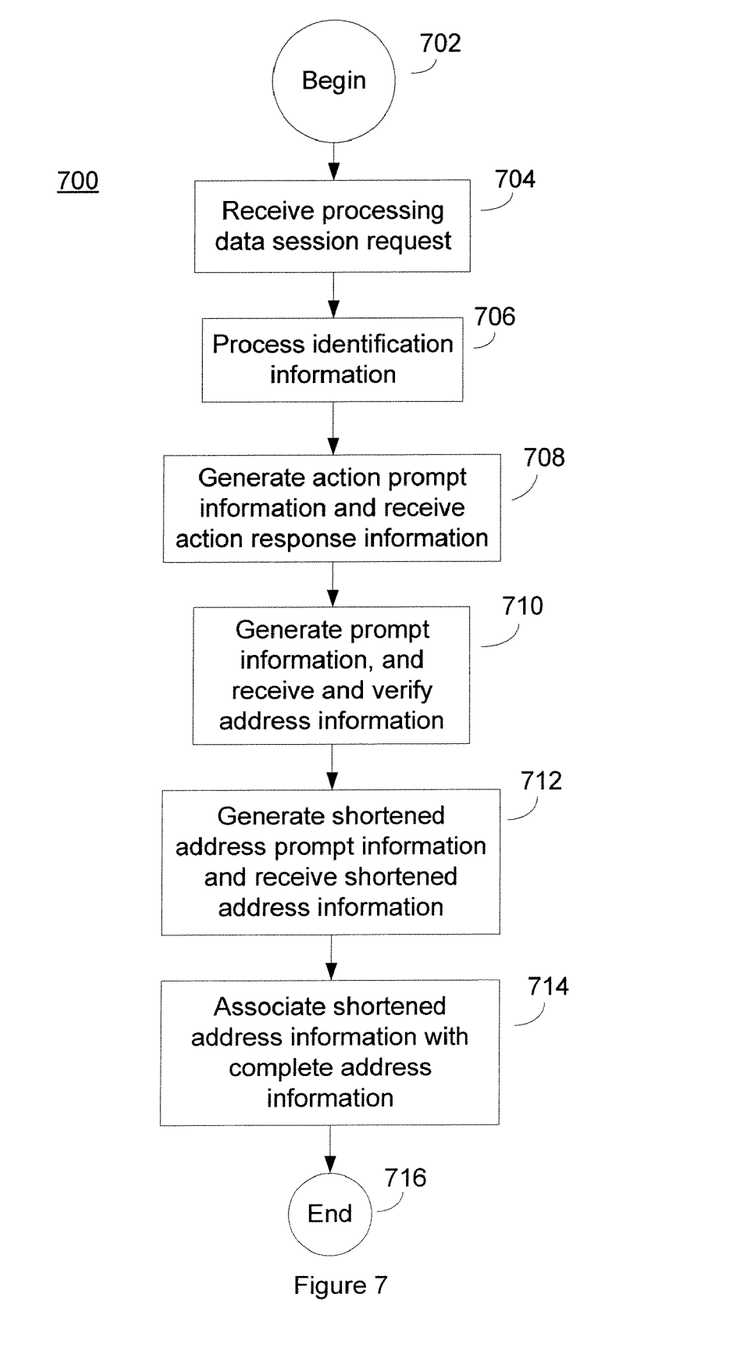
FIG. 7 illustrates a flow diagram of an exemplary process of creating and/or updating a voice dialing recognition directory of a Voice Dialing Recognition Server, according to an embodiment of the present invention.

FIG. 7 illustrates an exemplary flow diagram for creating and/or updating the VDR directory of the VDR Server 126. The flow diagram 700 may begin at 702 and may continue to 704.

In 704, the processing module 506 of the VDR Server 126 may receive a processing data session request from the request module 408 via the VDR communication module 502 for establishing a processing data session between the SIP Device 110 and the VDR Server 126. The processing data session request may include identification information for uniquely identifying the user and/or the User Interface 114.

In 706, the processing module 506 may process the identification information to uniquely identify the user and/or the User Interface 114 and to determine whether the identification information corresponds to a VDR directory. The processing module 506 may deteiniine that the user is a new user based on the identification information or may identify a previous VDR directory associated with the identification information.

In 708, the processing module 506 may instruct the VDR communication module 502 to transmit action prompt information to the SIP Device 110 for prompting the user to select an action (e.g., add a new address, add a new address; modify an existing address, etc.). The processing module 506 may then wait to receive action response information from the user through the User Interface 114 and the SIP Device 110.

In 710, the processing module 506, after receiving the action response information, may transmit address prompt information to the SIP Device 110 for prompting the user to enter an address. The processing module 506 may then wait to receive the address information from the user through the User Interface 114 and the SIP Device 110. The address information may be packets of digitized coded signals or packets of digitized voice signals, for example. The input type recognition module 504 may determine the input type of the address information, and the processing module 506 may verify that the address information corresponds to a complete address based on the dialing plan, as discussed above. If the address information corresponds to a complete address, the processing module 506 may use the address information as complete address information. If the address information does not correspond to a complete address, the processing module 506 may generate error information associated with an error message for informing the user that the address information does not correspond to a complete address.

In 712, the processing module 506, after receiving the address information, may transmit shortened address prompt information to the SIP Device 110 for prompting the user to input a shortened address. The processing module 506 may then wait to receive shortened address information from the user through the User Interface 114 and the SIP Device 110. The shortened address information may be one or more packets containing a sequence of digitized coded signals (e.g., a sequence of letters, numbers, symbols, etc.), or may be one or more packets containing digitized voice signals corresponding to a voice signal spoken by the user (e.g., spoken letters, numbers, a name, etc.), for example.

In 714, the processing module 506 may associate the shortened address information with the complete address information in the VDR directory. If a user speaks or enters the shortened address information for establishing a connection request, the processing module 506 may use the shortened address information to look-up the associated complete address information in the VDR directory. The processing module 506 may transmit the complete address information to the SIP Device 110 for use in generating a connection request. Once the user has created and/or updated the VDR directory, the user may end the processing data session. For example, the user may hang up a telephone at the User Interface 114, which may cause the User Interface 114 to send an on-hook signal to the SIP Device 110. The SIP Device 110 may then communicate with the VDR Server 126 to end the processing data session. The flow diagram 700 may continue to 716 and end.

Thus, the processing module 506 may permit a user of the User Interface 114 to create and/or update shortened addresses associated with complete addresses in a VDR directory for use in voice and/or digit dialing.

Figure 8:
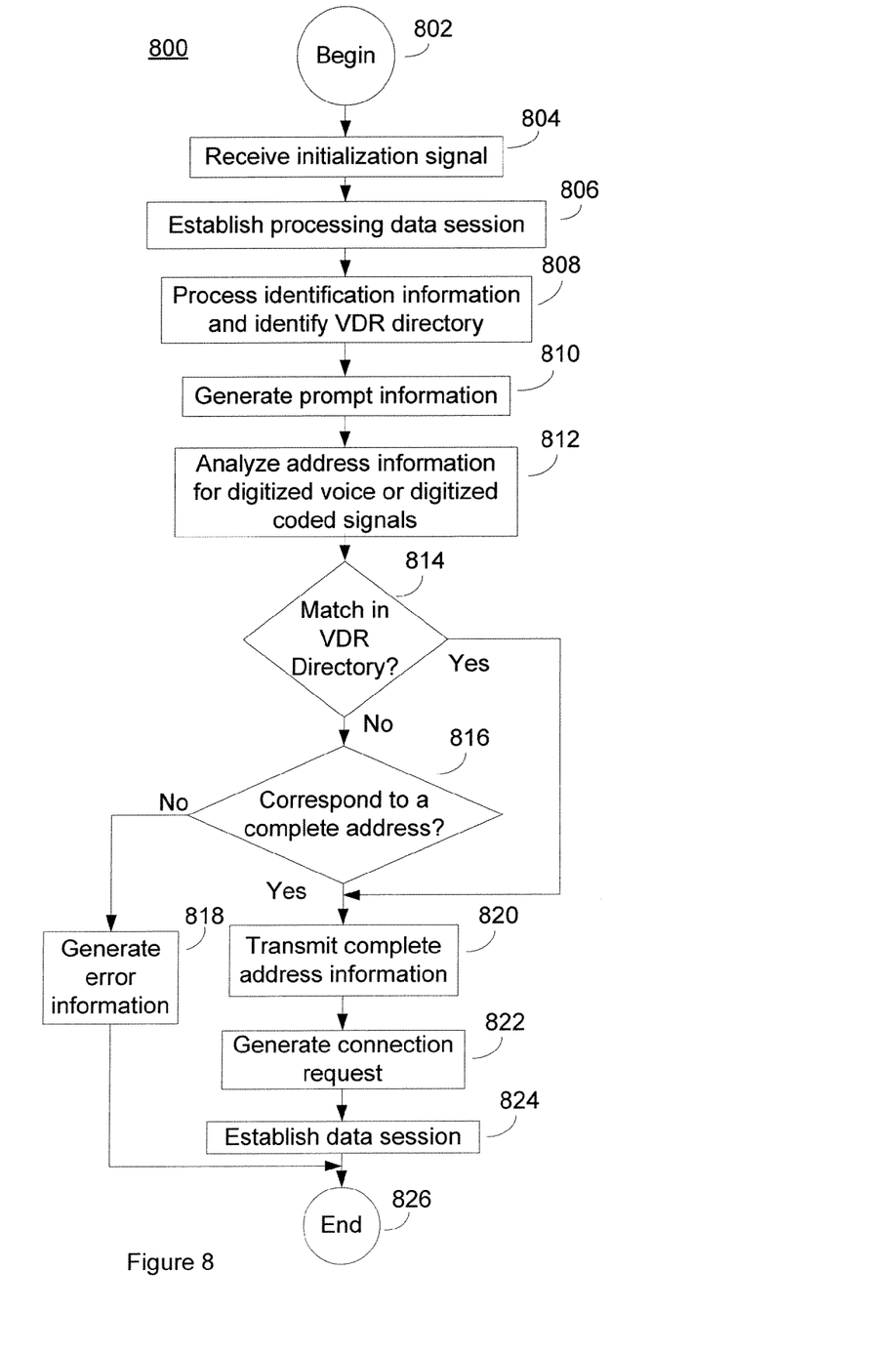
FIG. 8 illustrates a flow diagram of an exemplary process of a Voice Dialing Recognition Server processing user input for establishing a data session, according to an embodiment of the present invention.

FIG. 8 illustrates an exemplary embodiment of processes performed at the SIP Device 110 and the VDR Server 126 for generating a connection request based on information received from a user at the User Interface 114. The flow diagram 800 may begin at 802 and may continue to 804.

In 804, an initialization module 404 of the SIP Device 110 may identify an initialization signal transmitted by the User Interface 114 and may instruct the request module 408 to generate a processing data session request (e.g., SIP INVITE message) including the identification information of the user and/or User Interface 114.

In 806, the UA communication module 410 may forward the processing data session request to the VDR Server 126 and may communicate with the VDR Server 126 to establish a processing data session (e.g., a SIP dialog and media session).

In 808, the processing module 506 of the VDR Server 126 may process the identification information included in the processing data session request to identify a VDR directory associated with the user and/or User Interface 114.

In 810, the processing module 506 may generate prompt information for prompting the user of the User Interface 114 to input (i.e., speak or dial) a shortened address and/or a complete address. The SIP Device 110 may generate analog signals based on the prompt information for display and/or for generating audio at the User Interface 114. In response to analog signals (e.g., coded signals or voice signals) received from the User Interface 114, the receiver module 402 of the SIP Device 110 may generate address information based on the received analog signals and may instruct the UA communication module 410 to forward the address information to the VDR Server 126.

In 812, the input type recognition module 504 of the VDR Server 126 may identify an input type of the address information based on determining whether the address information may include one or more packets containing digitized voice signals or digitized coded signals.

In 814, the processing module 506 may determine whether the address information corresponds to any shortened address information of the VDR directory associated with the identification information. For digitized voice signals, the processing module 506 may perform signal processing on the digitized voice signals to attempt to substantially match the address information to any of the shortened addresses of the VDR directory. For digitized coded signals, the processing module 506 may process the digitized coded signals to attempt to match the address information to any of the number sequences of shortened address information stored within the VDR directory. If the processing module 506 identifies a match, the processing module 506 may include the complete address associated with the shortened address information in the complete address information and the flow diagram 800 may continue to 820. If the processing module 506 does not identify a match, the flow diagram 800 may continue to 816.

In 816, the processing module 506 may determine whether the address information corresponds a complete address, as discussed above. If the address information does not correspond to a complete address, the flow diagram 800 may continue to 818. If the address information corresponds to a complete address, the processing module 506 may include the complete address in the complete address information, and the flow diagram 800 may continue to 820.

In 818, the processing module 506 may determine an error and may forward error information to the SIP Device 110. The SIP Device 110 may generate an analog signal for producing audio, video, or a text message at the User Interface 114 informing the user that a data session may not be established based on the received address information. For example, the message may indicate that a telephone call may not be completed as dialed. The flow diagram 800 may continue to 826 and end.

In 820, the processing module 506 may instruct the VDR communication module 502 to transmit the complete address information to the SIP Device 110. For example, the processing module 506 may package the complete address information as a URI in a Refer-to field of a SIP REFER message, and the VDR communication module 502 may transmit the SIP REFER message to the SIP Device 110.

In 822, the request module 408 may generate a connection request including the complete address from the complete address information received at the UA communication module 410, and may instruct the UA communication module 410 to forward the connection request to the SIP Server 122.

In 824, the UA communication module 410 may communicate with the SIP Server 122 and the SIP Element 130, for example, to establish a data session. Once the data session is established, the User Interface 114 may exchange data with the SIP Element 130 over the IP Networks 120 and 124 via the SIP Device 110. The flow diagram 800 may continue to 826 and end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
    establishing a processing data session over a data network based on a processing data session request from a Session Initiation Protocol (SIP) device, wherein the processing data session request includes identification information;
    identifying a dialing directory of a user of the Session Initiation Protocol (SIP) device, using a processing module, based on the identification information in the processing data session request, the dialing directory comprising a plurality of complete addresses;
    receiving address information, at a communication module, over the data network via the processing data session;
    determining, using the processing module, an input type of the address information;
    processing, using the processing module, the address information to determine whether the address information corresponds to one of the plurality of complete addresses, wherein determining whether the address information corresponds to one of the plurality of complete addresses utilizes one or more packets of digitized voice signals in the event the input type is determined to be one or more packets of digitized voice signals, and wherein determining whether the address information corresponds to one of the plurality of complete addresses utilizes one or more packets of digitized coded signals transmitted as events to identify address information in the dialing directory in the event the input type is determined to be one or more packets of digitized coded signals;

providing the corresponding one of the plurality of complete addresses over the data network to the Session Initiation Protocol (SIP) device if the address information corresponds to one of the plurality of complete addresses;

providing functionality for the user to modify the identified dialing directory for a plurality of addresses of communication recipients; and providing functionality to verify a complete address input into the identified dialing directory, wherein verification is performed by the processing module using a dialing plan.

2. The method of claim 1, wherein the input type indicates that the address information comprises digitized coded signals including at least one of: digital representations of Dual-Tone Multi-Frequency (DTMF) signals and pulse dialing signals.

3. The method of claim 1, further comprising determining that the address information does not correspond to one of the plurality of complete addresses; and generating error information after determining that the address information does not correspond to one of the plurality of complete addresses.

4. The method of claim 1, further comprising generating prompt information for instructing the generation of a prompt message for prompting a user.

5. The method of claim 1, wherein the address information comprises shortened address information.

6. The method of claim 5, wherein the shortened address information comprises one or more packets of a digitized voice signal.

7. The method of claim 5, wherein the shortened address information comprises one or more packets of digitized coded signals.

8. The method of claim 5, wherein the dialing directory associates the shortened address information with a complete address.

9. The method of claim 8, further comprising identifying the one of the plurality of complete addresses in the dialing directory based on the shortened address information.

10. The method of claim 9, further comprising generating complete address information based on the one of the plurality of complete addresses.

11. The method of claim 1, further comprising:

in response to providing the corresponding one of the plurality of complete addresses over the data network to the Session Initiation Protocol (SIP) device, initiating at the Session Initiation Protocol (SIP) device a data session based on the corresponding one of the plurality of complete addresses.

12. The method claim 1, wherein the processing data session request comprises a Session Initiation Protocol (SIP) INVITE message, and providing the corresponding one of the plurality of complete addresses includes sending a SIP REFER message containing the corresponding one of the plurality of complete addresses to the Session Initiation Protocol (SIP) device.

13. A non-transitory computer readable medium comprising code to perform the acts of the method of claim 1.

14. The method of claim 1, wherein the Session Initiation Protocol (SIP) device contains the dialing directory, the Session Initiation Protocol (SIP) device comprises equipment located at a user location and wherein processing the address information may be performed on the Session Initiation Protocol (SIP) device.

15. The method of claim 1, wherein the events comprise Request For Comments (RFC) 2833 events.

16. A system comprising:

a communication module to establish a processing data session over a data network with a Session Initiation Protocol (SIP) device associated with a user based on a processing data session request and to receive address information over the data network via the processing data session, wherein the processing data session request includes identification information; and a processing module communicatively coupled to the communication module and configured to identify a dialing directory of the user based on the identification information in the processing data session request, the dialing directory comprising a plurality of complete addresses, the processing module further configured to process the address information to determine whether the address information corresponds to one of the plurality of complete addresses and to determine an input type of the address information, wherein determining whether the address information corresponds to one of the plurality of complete addresses utilizes one or more packets of digitized voice signals in the event the input type is determined to be one or more packets of digitized voice signals, wherein determining whether the address information corresponds to one of the plurality of complete addresses utilizes one or more packets of digitized coded signals transmitted as events to identify address information in the dialing directory in the event the input type is determined to be one or more packets of digitized coded signals, and wherein the processing module is further configured to receive instructions from the user to modify the identified dialing directory and to perform one or more modifications to the identified dialing directory for a plurality of addresses of communication recipients, wherein the processing module is configured to verify, using a dialing plan, a complete address input into the identified dialing directory.

17. The system of claim 16, wherein the address information comprises shortened address information.

18. The system of claim 17, wherein the processing module identifies the one of the plurality of complete addresses based on the shortened address information.

19. The system of claim 16, wherein the Session Initiation Protocol (SIP) device contains the dialing directory, the Session Initiation Protocol (SIP) device comprises equipment located at a user location and wherein processing the address information may be performed on the Session Initiation Protocol (SIP) device.

20. A system comprising:

a Session Initiation Protocol (SIP) gateway device communicatively coupled to a communication device, wherein the Session Initiation Protocol (SIP) gateway device is configured to receive instructions from a user to modify a dialing directory for a plurality of addresses of communication recipients and to perform one or more modifications to the dialing directory; and a server communicatively coupled to the Session Initiation Protocol (SIP) gateway device, the server comprising:

a communication module configured to establish a processing data session with the Session Initiation Protocol (SIP) gateway device over a data network based on a processing data session request and to receive address information over the data network from the Session Initiation Protocol (SIP) gateway device via the processing data session, wherein the processing data session request includes identification information; and a processing module communicatively coupled to the communication module and configured to identify a dialing directory of the user based on the identification information in the processing data session request, the dialing directory comprising a plurality of complete addresses, the processing module further configured to process the address information to determine whether the address information corresponds to one of the plurality of complete addresses and to determine an input type of the address information, wherein if the processing module determines that the address information corresponds to one of the plurality of complete addresses, the processing module is further configured to provide the corresponding one of the plurality of complete addresses to the communication module and the communication module is further configured to send the corresponding one of the plurality of complete addresses to the Session Initiation Protocol (SIP) gateway device over the data network, wherein determining whether the address information corresponds to one of the plurality of complete addresses utilizes one or more packets of digitized voice signals in the event the input type is determined to be one or more packets of digitized voice signals, and wherein determining whether the address information corresponds to one of the plurality of complete addresses utilizes one or more packets of digitized coded signals transmitted as events to identify address information in the dialing directory in the event the input type is determined to be one or more packets of digitized coded signals, wherein the processing module is configured to verify, using a dialing plan, a complete address input into the identified dialing directory.

21. The system of claim 20, wherein the Session Initiation Protocol (SIP) gateway device generates a connection request based on the corresponding one of the plurality of complete addresses.

22. The system of claim 20, wherein if the processing module determines that the address information does not correspond to one of the plurality of complete addresses, the processing module is further configured to provide an error indication to the communication module and the communication module is further configured to send a message based on the error indication to the Session Initiation Protocol (SIP) gateway device over the data network, and the gateway device generates an audio signal for producing an error message at the communication device.

23. The system of claim 20, wherein the Session Initiation Protocol (SIP) gateway device contains the dialing directory.

\* \* \* \* \*